United States Patent [19]
Teng

[11] Patent Number: 5,125,676
[45] Date of Patent: Jun. 30, 1992

[54] CONTROLLING STRUCTURE FOR A HANDLE AND CASTORS OF A STROLLER

[76] Inventor: Jerry M. S. Teng, 24-8, Hsu-Chung Ying, Chung-Jung Tsun, An-Ting Hsiang, Tai-Nan Hsien, Taiwan

[21] Appl. No.: 725,496

[22] Filed: Jul. 3, 1991

[51] Int. Cl.⁵ .............................................. B62B 7/12
[52] U.S. Cl. ................. 280/47.36; 16/35 R; 280/47.38
[58] Field of Search .............. 280/47.38, 47.36, 658, 280/47.371, 47.39; 16/35 R

[56] References Cited
U.S. PATENT DOCUMENTS

| | | | |
|---|---|---|---|
| 4,608,729 | 9/1986 | Huang | 280/658 |
| 4,779,879 | 10/1988 | Kassai | 280/47.39 |
| 4,831,689 | 5/1989 | Lo | 280/658 |

Primary Examiner—Eric D. Culbreth
Attorney, Agent, or Firm—Morton J. Rosenberg; David I. Klein

[57] ABSTRACT

This invention relates to a controlling structure for a handle and castors of a stroller and in particular to one utilizing a driven seat to activate a movable member which in turn pulls two strings so as to change the front castors from a freely rotatable state to a fixed-position state and the rear castors from a fixed-position state to a freely rotatable state when the handle is pushed to the other side, thereby enabling a user to control the stroller easily even when he pushes the handle to the other side so as to change the travelling direction.

1 Claim, 6 Drawing Sheets

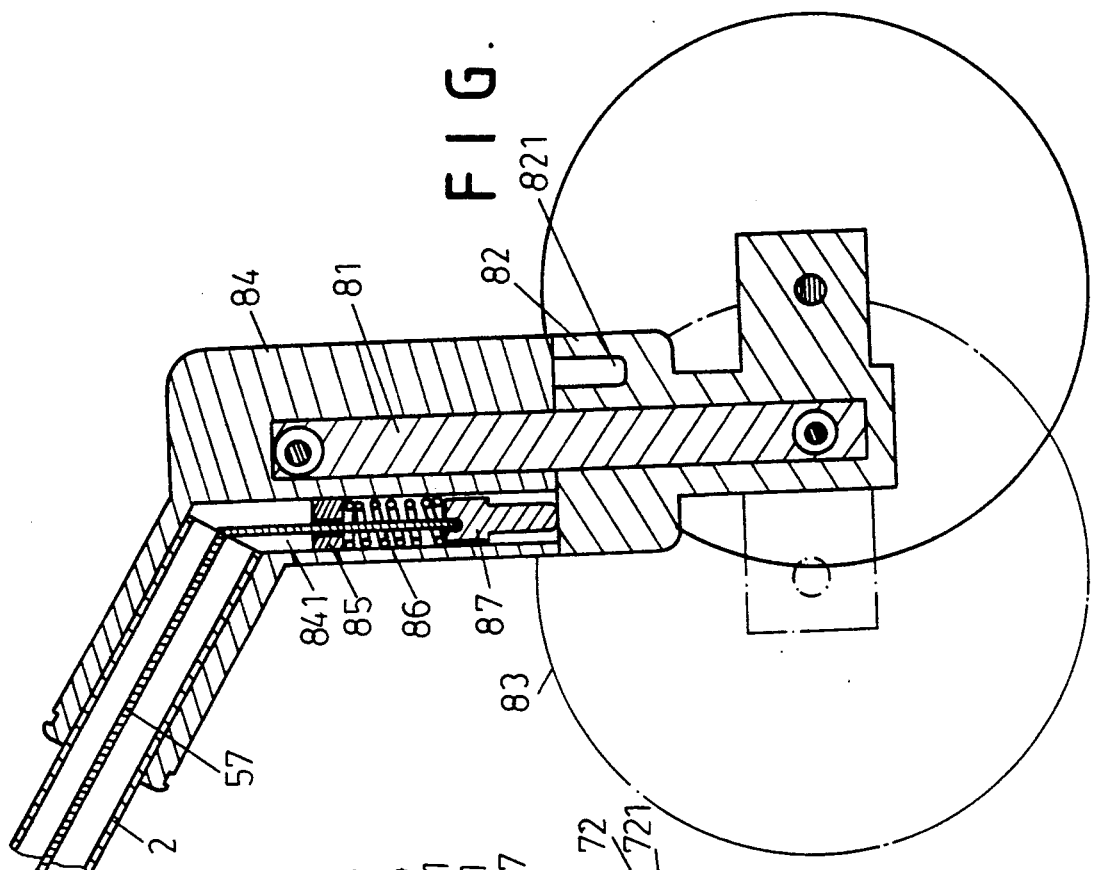
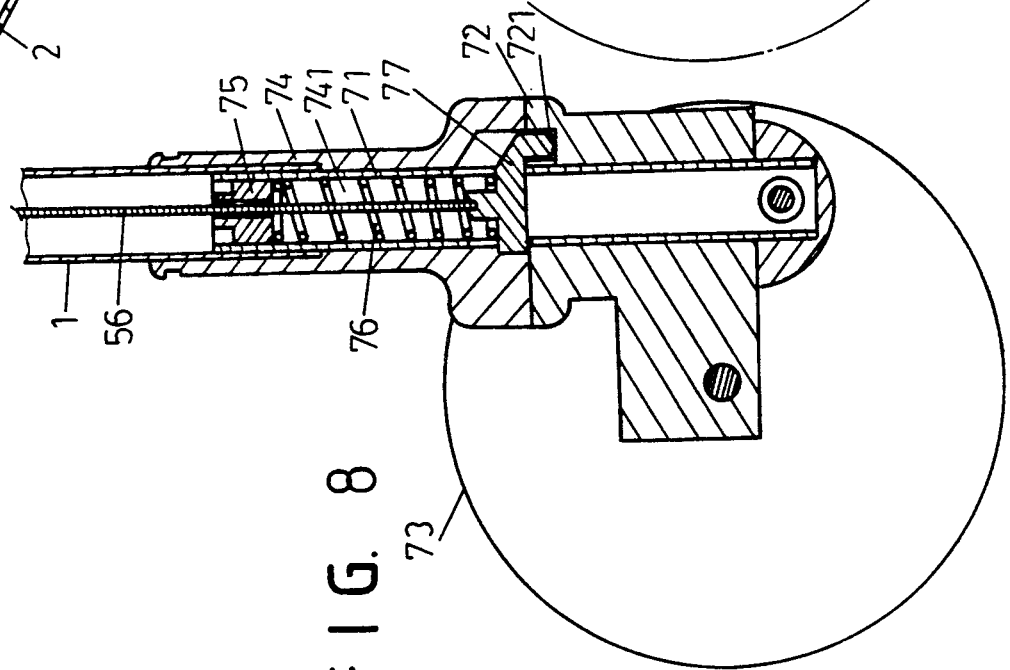

CONTROLLING STRUCTURE FOR A HANDLE AND CASTORS OF A STROLLER

BACKGROUND OF THE INVENTION

It is found that the handle of a prior art stroller may be pushed to either side as required and its front castors may be selected to rotate freely about the vertical axis or kept in a fixed position about the vertical axis and its rear castors are kept in a fixed position about the vertical axis. However, when the handle is pushed to the other side, the rear castors are still kept in a fixed position about the vertical axis while the front casters are freely rotatable about the vertical axis thereby causing it difficult to control the travelling of the stroller.

Therefore, it is an object of the present invention to provide a controlling structure for a handle and castors of a stroller which may obviate and mitigate the above-mentioned drawbacks.

SUMMARY OF THE INVENTION

This invention relates to a controlling structure for a handle and castors of a stroller.

It is the primary object of the present invention to provide a controlling structure for a handle and castors of a stroller which may enable the castors in the front to rotate freely and the castors in the rear to keep in a fixed position no matter when the handle is pushed to either side.

It is another object of the present invention to provide a controlling structure for a handle and castors of a stroller which is easily operated.

It is still another object of the present invention to provide a controlling structure for a handle and castors of a stroller which is simple in construction.

It is still another object of the present invention to provide a controlling structure for a handle and castors of a stroller which is economic construction.

It is a further object of the present invention to provide a controlling structure for a handle and castors of a stroller which is fit for mass production.

Other objects and merits and a fuller understanding of the present invention will be obtained by those having ordinary skill in the art when the following detailed description of the preferred embodiment is read in conjunction with the accompanying drawings.

BRIEF DESCRIPTION OF THE DRAWINGS

FIG. 8 is a sectional view showing the working principle of the portion B of FIG. 1; and FIG. 9 is a sectional view showing the working principle of the portion C of FIG. 1.

DETAILED DESCRIPTION OF THE PREFERRED EMBODIMENT

Figure 1:
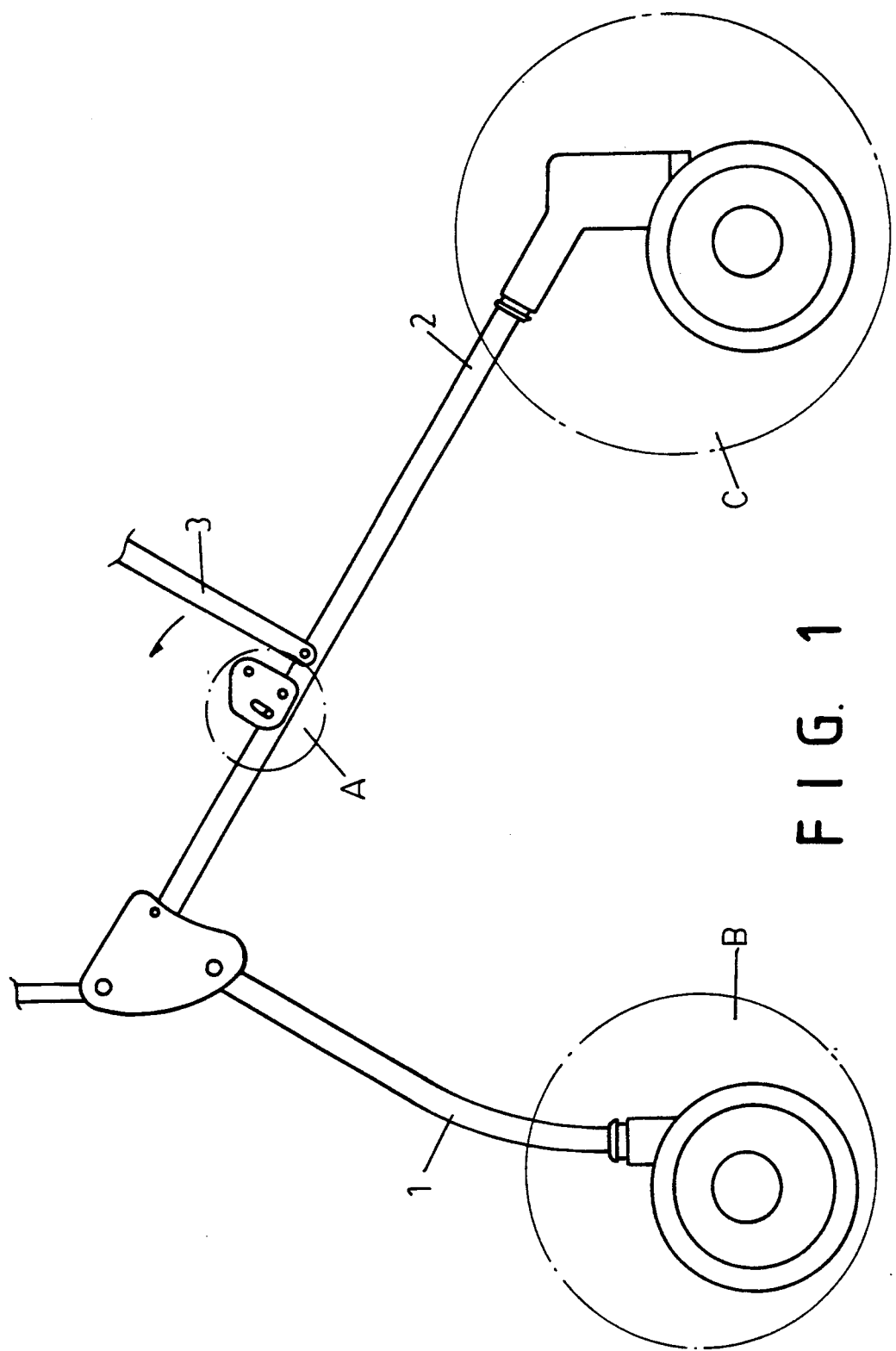
FIG. 1 shows part of a stroller equipped with a controlling structure for a handle and castors of a stroller according to the present invention.
Figure 2:
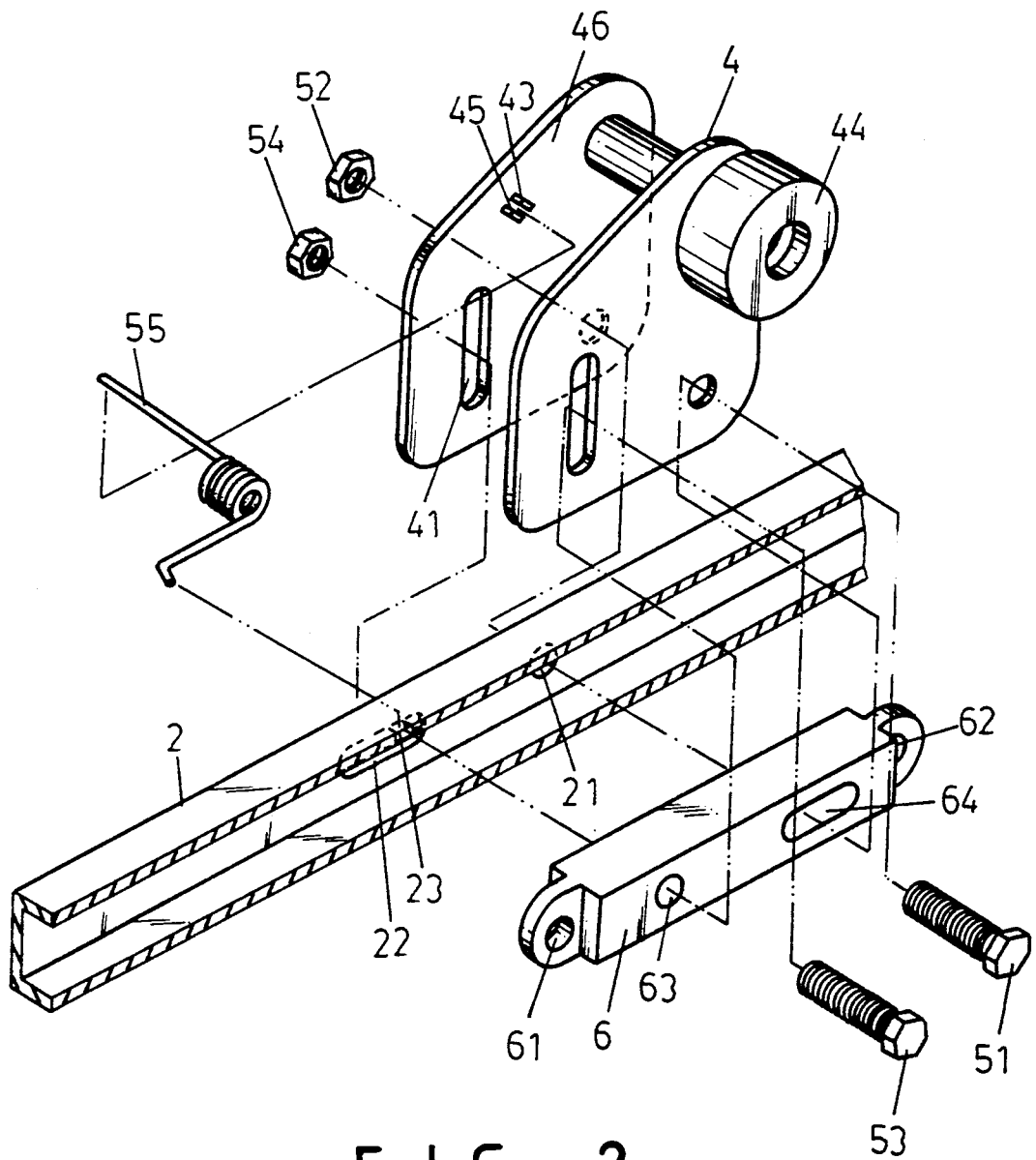
FIG. 2 is an exploded view of the portion A of FIG. 1.
Figure 3:
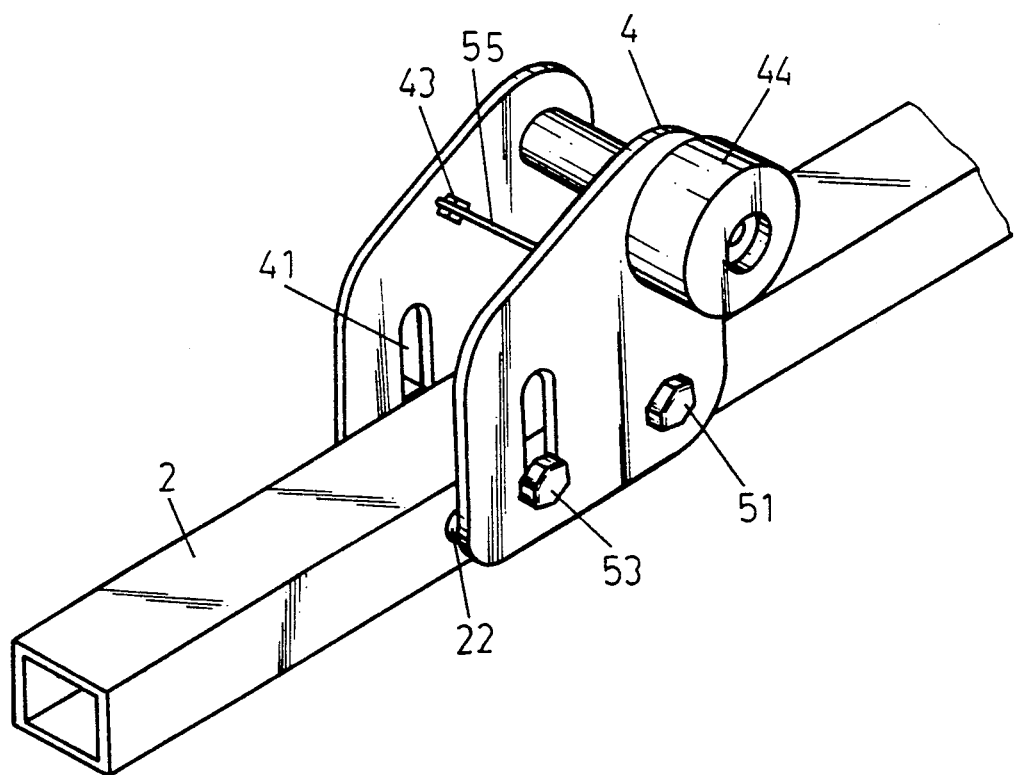
FIG. 3 is an enlarged perspective view of the portion A of FIG. 1.
Figure 4:
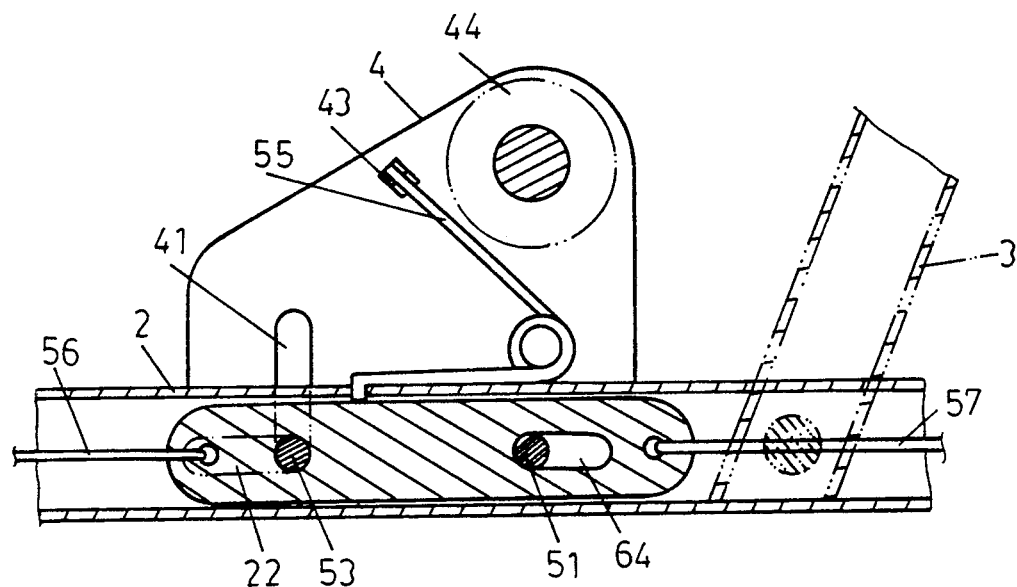
FIG. 4 shows the relationship between the component parts when the handle is kept n position.

With reference to the drawings an in particular to FIG. 1 thereof, the present invention resides in the controlling structure for the handle and castors of a stroller basically having two front stays 1, two rear stays 2 and a handle. The handle 3 may be pushed forwards or rearwards as required. The rear stay 2 is provide with a hole 21 and a slot 22. A driven seat 4, which has a first side plate 46 and a second side plate 47 spaced apart and having slots 41 and holes 42, is mounted on the rear stay 2 by a bolt 51 extending through the hole 21 of the rear stay 2 and the holes 42 of the first and second side plates 46 and 47 to engage with a nut 52 so that the driven seat 4 may be turned about the bolt 51. Further, the first side plate 46 is provided on its inner surface with two parallel protuberances 43 separated by a slit 45, while the second side plate 47 has a cylindrical member 44 on its outer surface. A spring 55 is fitted between the protuberances 43 and a hole 23 of the rear stay 2 with its one leg inserted into the slit 45 between the two protuberances 43 and its the other leg inserted into the hole 23 of the rear stay 2. A rectangular movable member 6 is received into the rear stay 2 and has a first hole 61 at one end and a second hole 62 at the other which are respectively connected with strings 56 and 57. The movable member 6 is formed with a hole 63 and a slot 64 and kept in position by a bolt 53 extending through the slot 22 of the rear stay 2 and the hole 63 of the movable member 6 to engage with a nut 54. The bolt 51 extends through the hole 21 of the rear stay 2, the hole 42 of the driven seat 4, and the slot 64 of the movable member 6.

Figure 5:
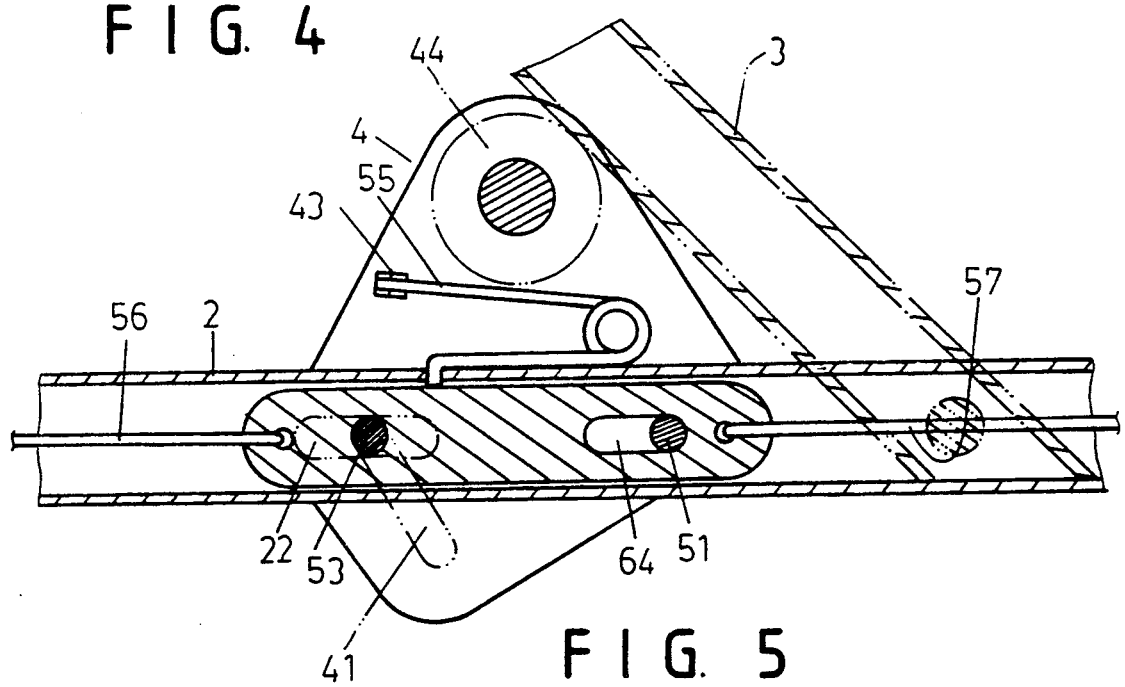
FIG. 5 shows the principle of the present invention.
Figure 7:
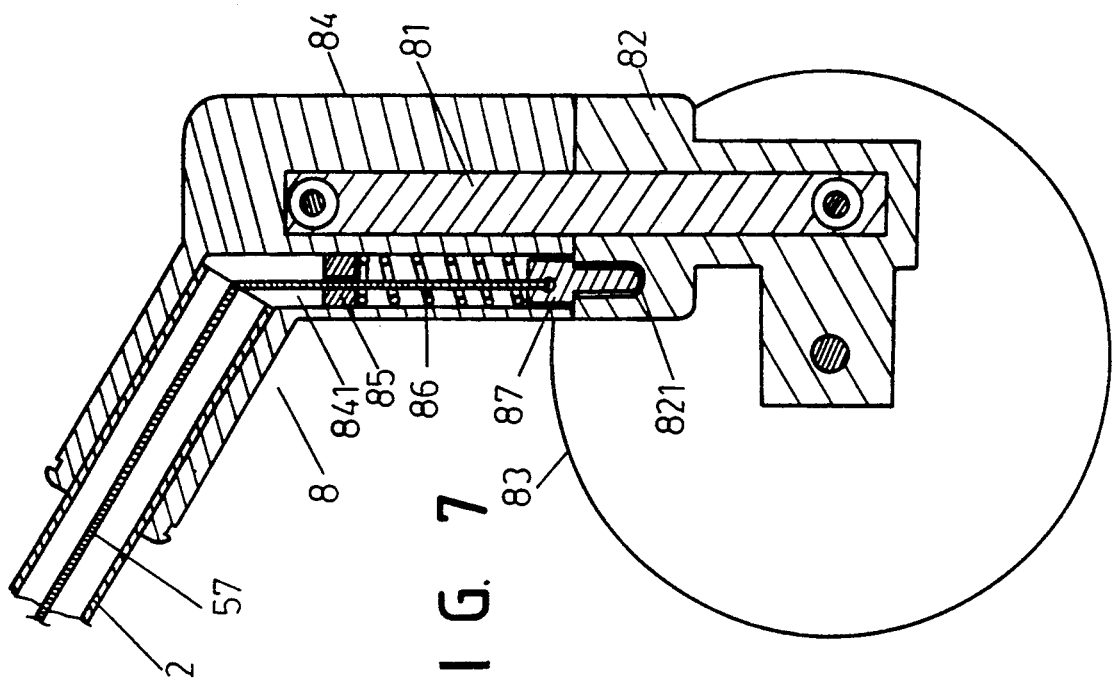
FIG. 7 is a sectional view of the portion C of FIG. 1.
Figure 6:
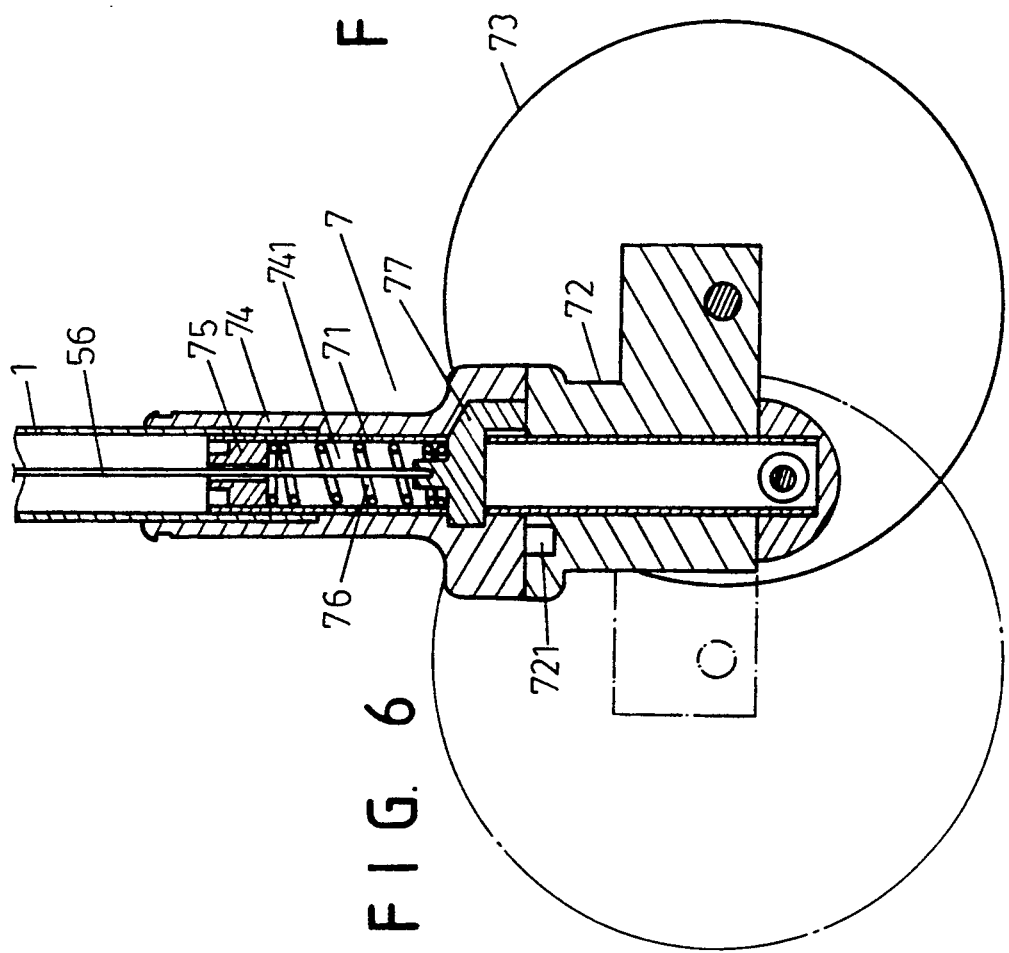
FIG. 6 is a sectional view of the portion B of FIG. 1.

When the handle 3 is moved to the other side (see FIG. 5), the handle 3 will push the cylindrical member 44 of the driven seat 4 so that the driven seat 4 will be turned with respect to the bolt 51 thereby compressing spring 55 and moving the bolt 53 along the slot 22 of the rear stay 2 with its slot 41. In the meantime, since the bolt 53 and the movable member 6 are joined together, the movable member 6 will also move within the rear stay 2 thus pulling the strings 56 and 57 to move with the movable member 6.

Referring to FIGS. 6, 7, 8 and 9, the front castor 7 and the rear castor 8 are respectively connected with the front stay 1 and the rear stay 2 and have axles 71 and 81, fixing lower blocks 72 and 82, and wheels 73 and 83 respectively. The upper end 74 of the front castor 7 is formed with a hole 741 which is communicated with the interior of the front stay 1. Within the hole 741 of the castor 7 there is mounted a plug 75 below which are a spring 76 and a locking pin 77. The fixing lower block 72 of the front castor 7 has a hole 721 for receiving the locking pin 77. The upper block 84 of the rear castor 8 is formed with a hole 841 in which are mounted a plug 85, a spring 86 and a locking pin 87. The lower block 82 of the rear castor 8 is also formed with a pin hole 821. The other ends of the strings 56 and 57 extend through the rear stay 2 to engage with the locking pins 77 and 87 respectively. Hence, when no force is applied to the handle 3 to change its direction, the movable member 6 may be moved in unison with the strings 56 and 57 and the locking pin 77 does not engage with the pin hole 721 of the fixing lower block 72 so that the front wheel 73 may freely rotate through an angle of 360 degrees with respect to its vertical axis while the rear wheel 83 is kept in a fixed position by the engagement between the locking pin 87 and the pin hole 821. As the handle 3 is pushed to other side, the string 57 will be pulled upwards thus pulling the locking pin 87 to compress the spring 86 and disengaging the locking pin 87 from the pin hole 821 and therefore, enabling the rear wheel 83 to rotate freely. Meanwhile, the string 56 is lowered by the locking pin 77 which is moved downwards by the recovering force of the spring 76. Hence, the locking pin 77 will engage with the pin hole 721 and the front wheel 73, which is originally rotatable freely, is kept in a fixed postion. In conclusion, when the handle 3 is pushed to the other side, the front castors will be changed from a freely rotatable state to a fixed-position state while the rear castors will be changed from a fixed-position state to a freely rotatable state thereby enabling an user to control travelling of a stroller easily even when the handle to pushed to other side so as to change the travelling direction of the stroller.

Although the present invention has been described with a certain degree of particularity, it is understood that the present disclosure is made by way of example only and that numerous changes in the detail of construction and the combination and arrangement of parts may be resorted to without departing from spirit and scope of the invention as hereinafter claimed.

I claim:

1. A controlling structure for a handle and castors of a stroller having two front stays, two rear stays and a movable handle, comprising:

said front stays and said rear stays being a tubular member, said rear stays having a hole and a slot;

a driven seat having a first side plate and a second side plate spaced apart and having a slot and a hole and mounted on each of said rear stays by a bolt extending through the hole of each of said rear stays and the holes of said first and second side plates to engage with a nut so that the driven seat may be turned about the bolt;

a movable member received into each of said rear stays and having a first hole at one end and a second hole at the other which are respectively connected with a first string and a second string, said movable member being formed with a hole and a slot and kept in position by a bolt extending through the slot of each of said rear stays, the hole of said driven seat, and slot of said movable member;

a front castor conected with each of said front stays and having an axle, a fixing lower block and a wheel, said front castor being formed at an upper end with a hole communicated with interior of each of said front stay and receiving a plug, a spring and a locking pin, said fixing lower block having a hole for receiving the locking pin;

a rear castor connected with each of said rear stays and having an axle, a fixing lower block and a wheel, said rear castor having an upper block being formed with a hole in which are mounted a plug, a spring and a locking pin and a lower block having a pin for receiving the locking pin;

said first and second strings extending through each of said rear stay to engage with said locking pins;

whereby when the handle is moved from a first position to a second position, the front castor will be kept in a fixed position with respect to a vertical axis while the rear castor will be able to rotate freely with respect to a vertical axis.

* * * * *